United States Patent [19]
Anderson et al.

[11] 3,808,837
[45] May 7, 1974

[54] FLEXIBLE DISC COUPLING FOR TANDEM COUPLING ASSEMBLY

[75] Inventors: Norman J. Anderson, Fairview; John L. Decker; Jon R. Manucso, both of Erie, all of Pa.

[73] Assignee: Zurn Industries, Inc., Erie, Pa.

[22] Filed: Sept. 6, 1972

[21] Appl. No.: 286,734

[52] U.S. Cl............... 64/13, 64/11 R, 64/15 R, 64/27 R
[51] Int. Cl............................................. F16d 3/78
[58] Field of Search.......... 64/13, 12 R, 11 R, 27 R, 64/15 R

[56] References Cited
UNITED STATES PATENTS
1,283,787  11/1918  Jencick.................................. 64/13
1,145,602  7/1915  Lieber.................................... 64/12
1,360,555  11/1920  MacDonald........................... 64/13

FOREIGN PATENTS OR APPLICATIONS
1,030,081  6/1953  France................................... 64/13
446,977  12/1912  France................................... 64/13

Primary Examiner—Samuel Scott
Assistant Examiner—Randall Heald
Attorney, Agent, or Firm—Edward W. Goebel, Jr.

[57] ABSTRACT

A flexible disc-type coupling for use in a tandem coupling assembly transmits torque through a plurality of flexible discs. Each of these discs has a flexing area which includes at least one, but not more than about four, circumferentially extending convolutions. The discs are held apart by incompressible spacers and the area between the convolutions is free from all solids so that contact between flexure points, and thus surface damage, is avoided.

16 Claims, 7 Drawing Figures

FLEXIBLE DISC COUPLING FOR TANDEM COUPLING ASSEMBLY

BACKGROUND OF THE INVENTION

This invention relates to mechanical couplings which connect one rotatable shaft to another rotatable shaft and, more particularly, to mechanical couplings for interconnecting rotating shafts which may become misaligned with respect to one another.

It is often advantageous to interconnect a pair of rotatable shafts so that the devices to which the shafts are connected can be rotated at the same speed. By way of example, one of the shafts may be connected to a turbine while the other of the shafts is connected to an electric generator or to a pump which is driven by the turbine. The turbine shaft is often referred to as the driving shaft, while the second shaft is often referred to as the driven shaft.

It has long been recognized that the mechanical coupling which interconnects these shafts must be able to accept a pair of shafts in which the individual shafts may be misaligned. At times, it may be extremely difficult to install the devices to which the shafts are connected so that the shafts are exactly aligned at the installation. Even where this alignment is obtained at installation, settling of the foundations supporting these devices, bearing wear, and heat generated during the operation of the devices often cause the interconnected shafts to become misaligned.

The resulting misalignment can occur in any one or two or all three of the folling manners: It can occur in "angular misalignment" wherein the axes of the two shafts intersect at an angle. It can also occur in "parallel offset" wherein the axes of the two shafts do not intersect at all. Or, it can occur in "axial movement" comprising expansion or contraction along the axis of the shafts.

It has been a continuing problem in the art to provide a flexible coupling which is sufficiently flexible to accept all three of the types of misalignment, while still having sufficient torque carrying capacity to transmit the desired level of torque between the two coupled shafts, while remaining in dynamic balance throughout its operation and, while still misaligned, not producing large forces or moments on interconnected devices. The problem has become more acute where the shafts are driven at relatively high speeds of revolution because of the resulting increase in the centrifugal forces on the couplings.

Those skilled in the art have attempted to fill these needs by providing flexible couplings manufactured out of one or more laminated discs. Generally, this type of coupling makes use of flat discs or diaphragms of steel or other metal which are connected between the pair of shafts to be coupled. In many of these couplings, the discs tend to flex between bolts, located around the circumference of the discs to accommodate misalignments which normally are present. This then allows the shafts to remain interconnected in spite of the misalignment. Where the parallel offset type of misalignment is a factor to be considered, many of these disc-type couplings are used in a tandem coupling assembly. In this assembly, a pair of disc-type couplings is separated by a coupling shaft. Each of the shafts to be interconnected by the tandem assembly is attached to a separate one of these disc-couplings. The position of the coupling shaft floats between the interconnected shafts as the shafts themselves become misaligned. Paradoxically, the flexible discs must be laterally stiff enough to support the coupling shaft and prevent any unstable vibratory motion.

The tandem coupling assembly has another advantage. Often the devices from which the shafts protrude, such as turbines, pumps, and generators, have associated equipment including piping, gages, and the like, mounted near the ends of the shafts. Thus, it is difficult to mount two such devices close together. The coupling shaft of the tandem coupling assembly can be provided in various lengths to accomodate the required distances between the shafts of two such devices. Furthermore, by providing a coupling shaft of sufficient length, bearings and seals used with the devices can be removed by disconnecting the coupling shaft and removing these through the resulting opening, rather than by dismantling the devices. One series of disc-type couplings of this sort has been manufactured by the assignee of this invention under the registered trademark AMERIDISC.

Many of these prior art disc-type couplings have been used with a great deal of satisfaction for numerous industrial and commercial applications. However, industrial improvements have required the operation of these couplings at higher speeds and for the transmission of increasing torque levels. Furthermore, there is a demand to provide couplings having the capability of accepting larger shaft misalignment, parallel offset and the angular type, as well as increased axial movement. Furthermore, a need has arisen for a coupling which can accept the increased misalignment without producing significant forces and moments back to the devices to which the coupled shafts are connected. Such forces and moments can cause these devices to have increased wear and, thus, have increased maintenance requirements. Such forces and moments can also contribute to serious deleterious vibrational effects of the total rotating system.

It is an object of this invention to provide a flexible disc-type coupling for use in a tandem coupling assembly which can accept increased misalignment of the interconnected shafts while at the same time providing a decrease in the forces and moments on the devices to which the shafts are fastened.

It is another object of this invention to provide a flexible disc-type coupling for use in a tandem coupling assembly which maintains its mechanical stability while providing for increased misalignemnt of the interconnected shafts.

It is still a further object of this invention to provide a flexible, disc-type coupling for use in a tandem coupling assembly which provides for increased misalignment of the interconnected shafts, while avoiding the development of high levels of stress within the coupling discs.

BRIEF DESCRIPTION OF THE INVENTION

Briefly stated, and in accordance with one aspect of this invention, a flexible coupling member is provided for use in a tandem coupling assembly. In this assembly, a first rotatable shaft is connected to a second rotatable shaft through the use of a pair of disc-type flexible coupling members which are separated by a coupling shaft. Each of the rotatable shafts is attached to a separate one of the flexible coupling members in this type of an assembly. In the flexible coupling member, the torque is transmitted through a plurality of circular discs. Each of these discs has at least one and no more than about four circumferentially extending convolutions, each of these convolutions being identical in shape and identical in position on its respective disc with respect to a corresponding convolution on the other discs. First and second clamping means are used for defining a ring-shaped flexing area on each of the discs. This flexing area includes the aforesaid convolutions, and it is centered on the axis of each of the discs. Incompressible spacing means, such as but not necessarily limited to metal rings, are mounted between adjacent discs to prevent the discs from contacting one another during the operation of the flexible coupling member. Neither the spacing means nor any other solid extends into the space between the convolutions of adjacent discs. Thus, when the discs are flexed in the area containing the convolutions, surface damage from contacting flexure points is avoided.

Substantially improved performance has been obtained where the size of the flexing area is such that the ratio of the radius of the inside circumference of the flexing area to the radius of the outside circumference of the flexing area is less than approximately six-tenths. A particularly advantageous size flexing area comprises one in which the ratio of the radius of the inside circumference to that of the radius of the outside circumference of the flexing area is between about four-tenths and about six-tenths. Where the convolutions in the flexing area consist of a pair of convolutions forming an S-shape, substantially improved performance is obtained when the product of the thickness of a disc (h) expressed in inches, and the peak-to-peak height of the two convolutions (s), measured at the center lines of the disc material and also expressed in inches, is greater than about 0.0015 and less than about 0.0025.

The specification concludes with claims particularly pointing out and distinctly claiming the subject matter of this invention. The organization and manner and process of making and using this invention, together with further objects and advantages thereof, may be best understood by reference to the following description taken in conjunction with the accompanying drawings. The same number is used to designate identical parts shown in more than one drawing.

DESCRIPTION OF PREFERRED EMBODIMENTS

Figure 1:
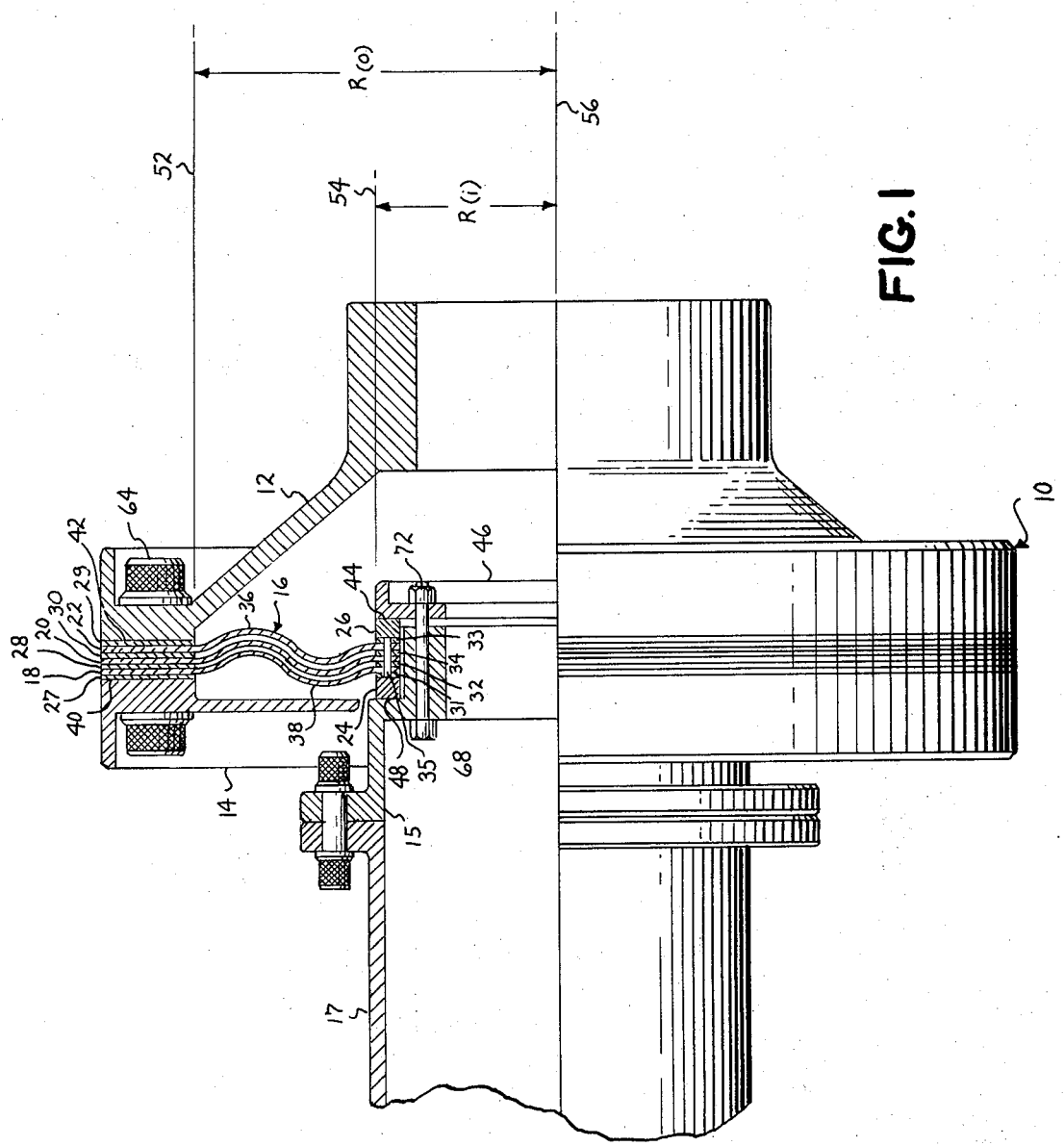
FIG. 1 is a view, partially in cross section, of a flexible disc-coupling for use in a tandem coupling assembly which is made in accordance with this invention.
Figure 6:
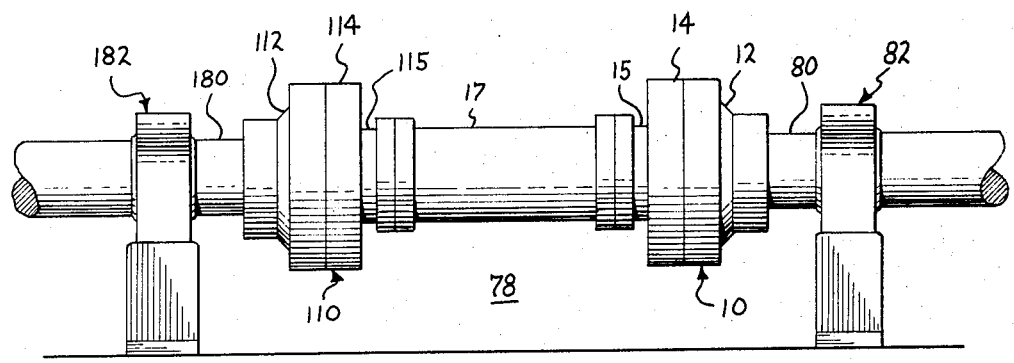
FIG. 6 is a schematic drawing showing a typical tandem coupling assembly showing the rotatable shafts interconnected by the assembly and attached to their respective machines.

Referring, now more specifically, to the drawings and in particular to FIG. 1, a flexible disc coupling made in accordance with this invention is used to interconnect a pair of rotatable shafts. A flexible disc coupling 10 comprises an adapter 12, a retainer 14, a disc pack 16 (including a plurality of discs 18, 20, and 22) and back-up rings 24 and 26. The coupling 10 further includes an adapter 15 which is connected to the inside circumference of the disc pack 16. The adapters 12 and 15 are to be connected to the shafts which are interconnected by the coupling 10. The adapter 12 is made to be connected to a shaft of one of the devices, such as a turbine or a pump, to be coupled by a tandem assembly, as shown in FIG. 6. The adapter 15 is shown connected to a coupling shaft 17 of the tandem assembly.

The disc pack 16 includes not only the plurality of discs shown, but also includes incompressible spacing means 28 and 30 and 32 and 34, each of which is mounted between adjacent discs. End pieces 27 and 29 are included in the disc pack at the outside circumference of the discs, while end pieces 31 and 33 are included in the disc pack at the inside circumference. The spacing means 28 is mounted between the discs 18 and 20 at the outside circumference of the discs, and the spacing means 30 is mounted between the adjacent discs 20 and 22 in the same location. The spacing means 32 is mounted at the inside circumference of the discs, between the discs 18 and 20, while the spacing means 34 is mounted in the same position between the adjacent discs 20 and 22. All the members of the disc pack 16 are held together by a series of rivets or bolts or other fastening means, one of which is shown at 35 on the inside circumference of the discs. The back-up rings 24 and 26 are mounted adjacent the disc pack 16 at the inside circumference of the discs.

Figure 1A:
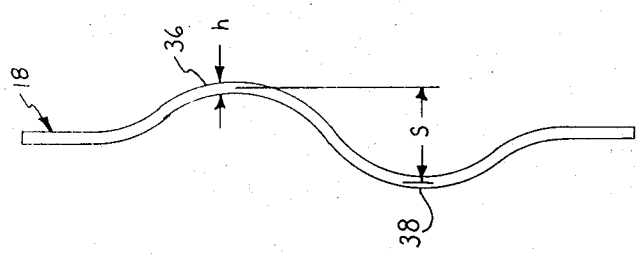
FIG. 1a shows a portion of a disc having two convolutions.

In accordance with this invention, each of the discs has a ring-shaped flexing area which includes at least one convolution. Each of these convolutions extends circumferentially with respect to the disc on which it is included. It is identical in shape and identical in position on its respective disc with respect to corresponding convolutions on other discs. In the present embodiment of this invention, the flexing area includes a pair of convolutions 36 and 38, as pointed out on disc 18 by way of example. FIG. 1a shows these convolutions in more detail, as will be discussed below.

The coupling shown in the preferred embodiment of this invention indicates that each coupling of this type should have at lease one convolution and no more than about four such convolutions at a maximum. The convolutions must provide sufficient flexibility to adapt to the various types of misalignment which occur during the normal operation of the flexible coupling. However, if the flexibility provided is too great, the coupling can flex too easily and become unstable while it is rotating. The maximum number of convolutions which can be used appears to be somewhere between three and five convolutions, depending upon the design of the disc pack or discs, the convolutions themselves, and the application made of the flexible coupling.

In further accordance with this invention, the inflexible spacing means, the spacing means 28 and 30 and 32 and 34, must extend between the discs to prevent adjacent discs from contacting one another during the operation of the flexible coupling member 10. However, neither these spacing means nor any other solid should be present in the area containing the convolutions such as 36 and 38. This is the area of the discs which is flexed during operation of the flexible coupling member 10. Should these discs contact solid materials, the discs may encounter surface damage at the various flexure points and as a result failure would occur.

Thus, the spacers 28 and 30 extend between the adjacent discs 18, 20, and 22 in the area defined by clamping surfaces 40 and 42 of the retainer 14 and the adapter 12, respectively. Similarly, the spacers 32 and 34 extend between these discs in an area defined by the clamping means at the inside circumference of the discs. These include the backup rings 24 and 26, a clamping surface 44 of the retainer 46, and a clamping surface 48 of the adapter 15 at the inside circumference of the discs.

The flexing area discussed above is an area of the discs having an outside circumference 52 defined by clamping means including the clamping surface 40 and 42 and also defined by the end pieces 27 and 29, beyond which the discs can flex. The inside circumference of this flexing area is defined by the clamping surfaces 44 and 48, the backup rings 24 and 26 and the end pieces 31 and 33. These members of the assembly are instrumental in clamping the discs together at the inside circumference while allowing these discs to flex in the areas of the convolutions.

Experience with flexible couplings such as that illustrated has shown that superior performance is obtained by providing flexing areas of a particular size in a range of sizes defined by the ratio of the radius of the inside circumference of the flexing area (R(i)) to the ratio of the radius of the outside circumference of this flexing area (R(o)). R(i) is the distance between the inside circumference 54 and a center line 56 of the coupling, while R(o) is the distance between the outside circumference 52 and the center line 56.

Figure 2:
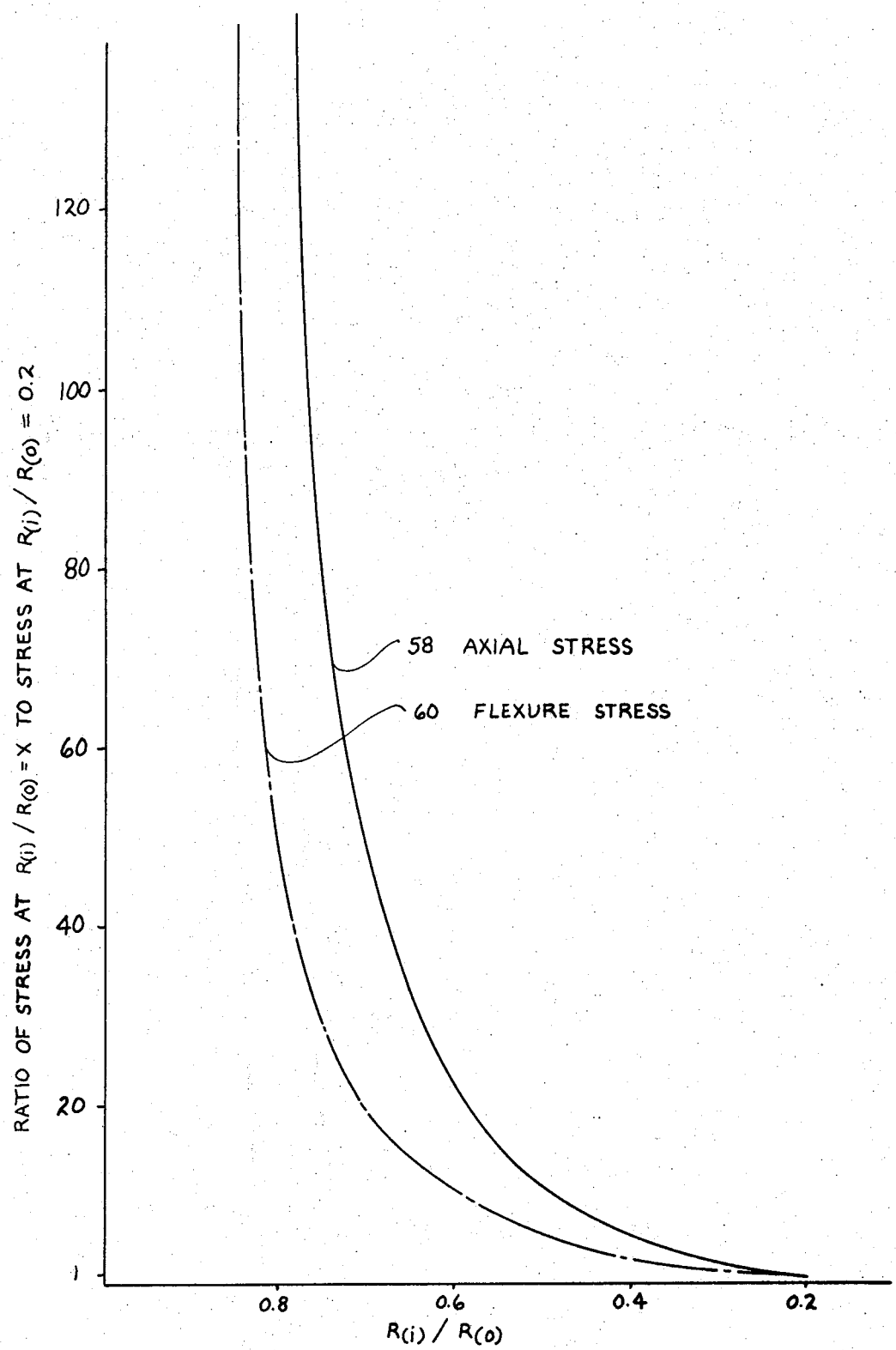
FIG. 2 is a set of graphs showing the various stress levels on the individual discs at the various ratios of the radius of the inside circumference of the flexing area of the discs to the radius of the outside circumference of this flexing area.

Referring now to FIG. 2, the ratio of R(i) to R(o) is plotted horizontally, while increases in stress above the level where the ratio of R(i) to R(o) is 0.2 are plotted vertically on the graph. A solid curve 58 indicates the axial stress for various ratios of the radii, while the broken line curve 60 indicates the flexure stress for various ratios of the radii. By axial stress is meant the stress which occurs when the axis increases or decreases in length, say due to thermal expansion or contraction. By flexure stress is meant the stress due to angular misalignment and parallel offset of the axes of the shafts to be coupled.

Upon the development of the couplings of this invention, theoretical equations were derived to calculate the axial and flexure stresses. These theoretical equations were proven by way of tests on one pack of discs having a thickness of 0.018 and another pack of discs having a thickness of 0.032 inches. The outside diameter of the discs was 12 ½ inches. The inside radius of the flexing area was 3.375 inches, while the outside radius of the flexing areas was 5.375 inches. Using the equations which were proven by measuring the stress at preselected areas on the discs above, the curves 58 and 60 were plotted.

A perusal of FIG. 2 indicates that where the ratio of the radii is greater than about 0.6, the axial stress and the flexure stress increase substantially. Thus, it is particularly advantageous to provide discs having a flexing area in which the ratio of the radius of the inside circumference to the radius of the outside circumference is less than approximately 0.6. It is also advantageous to provide flexing areas wherein the aforesaid ratio is between about 0.4 and about 0.6. Where the ratios become smaller than 0.4 the flexing areas becomes quite large, the discs tend to flex more readily, and a flexible coupling using these discs can tend to become unstable.

Figure 3:
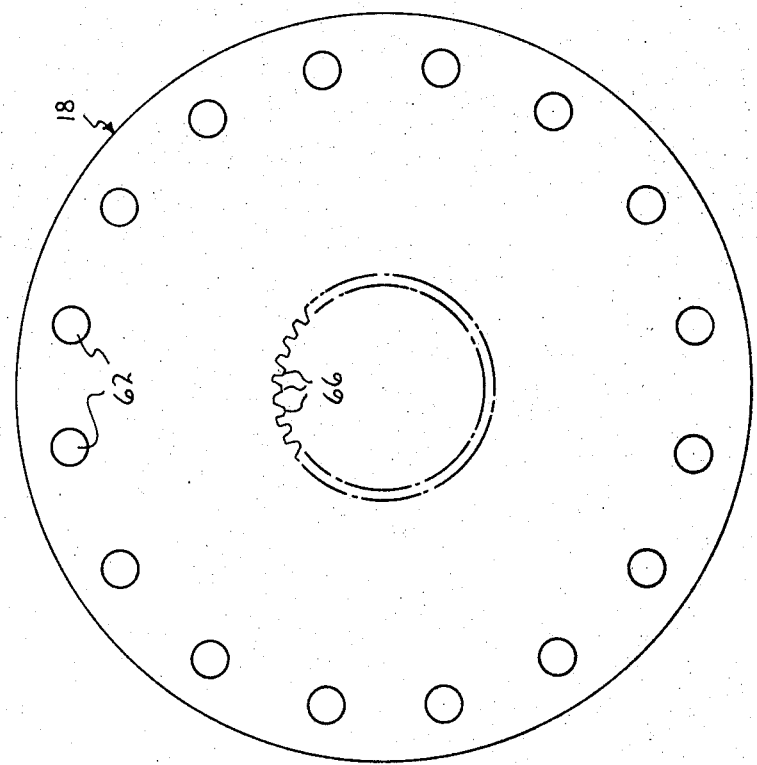
FIG. 3 is a front view of a typical disc used in accordance with this invention.

Referring now to FIG. 1 once again, and particularly to FIG. 1a, where it is desired to use a pair of convolutions forming the S-shape shown in the present embodiment of this invention, there is a certain relationship between the thickness ($h$) of the discs used and the peak-to-peak height ($s$) of the convolutions, both measured in inches, which provides superior results. The peak-to-peak distance of the convolutions is measured from the center line of the disc material of each of these peaks. An advantageous reduction in thrust load on devices to which these couplings are fastened and a substantial reduction in stiffness of a coupling using an S-shaped convolution configuration is obtained where the product of this thickness of the discs and the peak-to-peak height is greater than about 0.0015 and less than about 0.0025. ($0.0025 > sh > 0.0015$). FIG. 3 shows a view of the coupling disc 18 from a point along the axis of the coupling. This disc 18 includes a plurality of holes 62 located around the outside circumference of the disc. These holes are made to accomodate a plurality of bolt assemblies, such as the assembly 64 of FIG. 1. These bolt assemblies are tightened to squeeze the disc pack 16 together so that the discs 18, 20, and 22 are tightly held between the end pieces 27 and 29 and the spacers 28 and 30.

Figure 5:
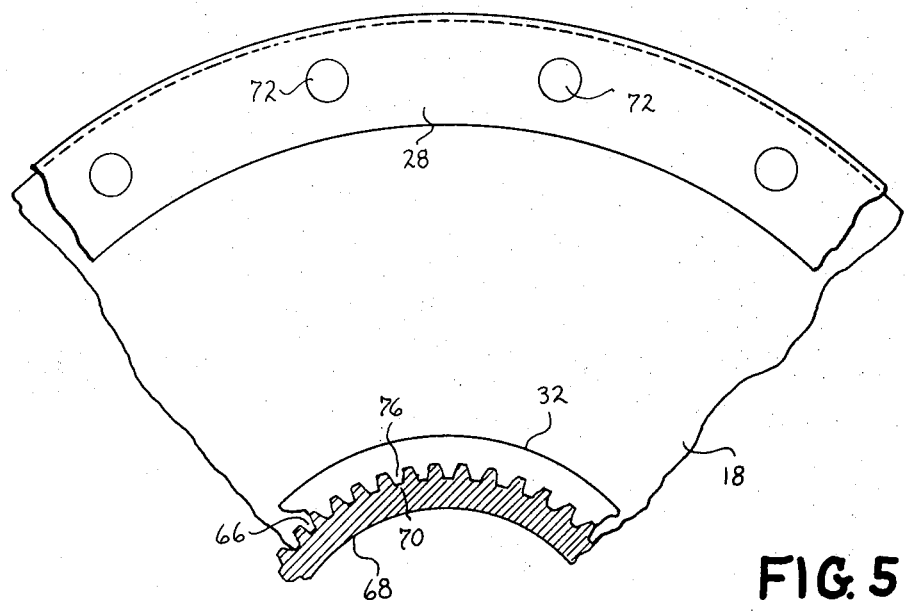
FIG. 5 shows a portion of a disc pack as it is coupled to an adapter which in turn is connected to a shaft.

The inside diameter of the disc 18 includes a plurality of splines 66 which fit into a corresponding plurality of slots on inside portion 68 of the adapter 15. These slots are shown in FIG. 5. Referring once again to FIG. 1, the disc pack 16 and the backup rings 24 and 26 are retained together tightly due to a plurality of bolt assemblies such as the bolt assembly 72. These bolt assemblies include bolts having relatively long distances between bolt heads and nuts so that the bolts have a relatively large amount of elongation when tightened. Using fine pitched threads, then, it takes more than a slight turn of the nuts of these assemblies to substantially relax the clamping forces. These bolt assemblies 72 are tightened substantially so that the torque on the end pieces 31 and 33 and on the spacers 32 and 34 can be transferred through friction to the adjacent discs.

Because of the relatively high torque levels being transferred about the points on the inside diameter of the discs, this coupling uses the splines 66 to transfer the torque between the discs and the adapter 15. For some applications of this invention it may be possible to use either bolt assemblies passing through the disc pack 16 and the retainer 46 and the adapter 15, or some other means to transfer torque between the disc pack 16 and the adapter 15.

Figure 4:
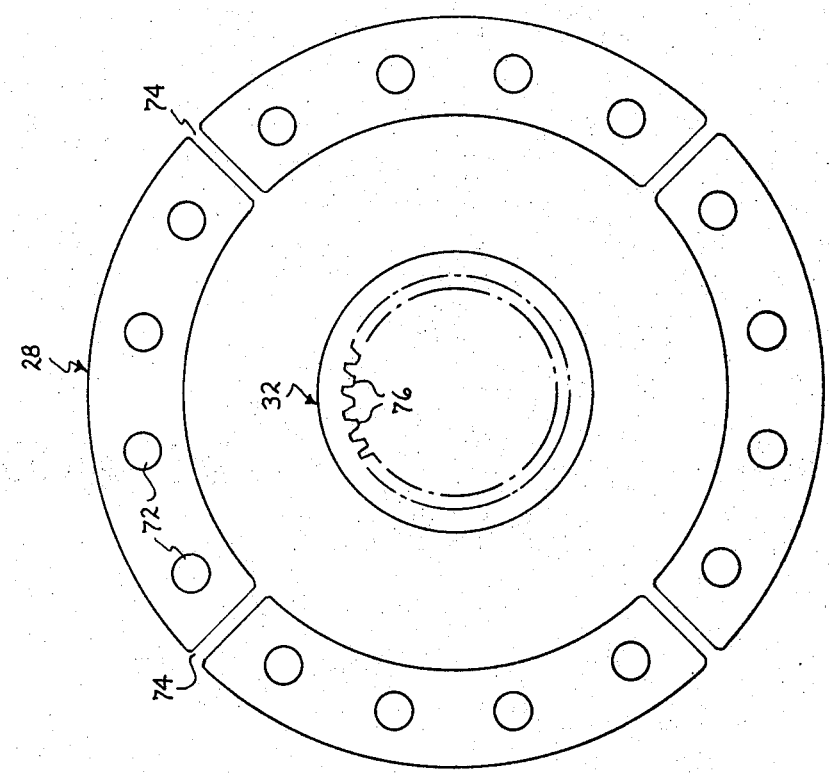
FIG. 4 shows one type of inflexible spacers used between adjacent discs of this coupling.

FIG. 4 shows a type of spacing means which can advantageously be used between adjacent discs pack 16 to prevent adjacent discs from making contact during the operation of the coupling. FIG. 4 shows the spacing means 28 and the spacing means 32 of FIG. 1. In accordance with this invention, these spacing means are relatively incompressible. Incompressible materials other than metals can be used, and spacer configurations other than rings can be used also if desired. The spacing means 28 has a plurality of holes 72 adapted to receive the bolts from bolt assemblies such as 64 of FIG. 1. The spacing means or ring 28 is segmented to provide vents from the area between adjacent discs to the atmosphere. The purpose of these vents 74 is to allow air, which expands due to heating of the discs during high temperature operation, to escape to the atmosphere. Otherwise a serious pressure buildup could occur between adjacent discs and possibly affect the operation of the coupling.

In the embodiment of the spacing means shown in FIG. 4, the ring 28 is broken up into four segments, each of which has a venting area 74 about one thirty-second of an inch in width. The number and size of the venting areas can vary, depending upon the design of the particular coupling made in accordance with this invention.

The ring 32 which is also shown in detail in FIG. 4 includes a plurality of splines 76 which correspond with the splines 66 of the disc 18 shown in FIG. 3. As shown more clearly in FIG. 5, these splines 66 mesh with the slots 70 of the inside portion of the adapter 15 as do the splines 66.

FIG. 6 will be referred to from time to time while discussing the operation of this invention and further advantages of using this invention in a tandem coupling assembly. FIG. 6 shows a tandem coupling assembly 78 which includes a pair of flexible disc couplings made in accordance with this invention. The flexible disc coupling 10 shown in FIG. 1 is provided as the coupling on the right-hand side of the tandem coupling assembly 78. As shown, the adapter 15 of the flexible coupling 10 is connected to the coupling shaft 17. This coupling shaft 17 is fastened to an adapter 115 of a second flexible coupling 110. The drawing further schematically shows a retainer 114 and a second adapter 112 of the second flexible disc coupling 110.

As mentioned above, the tandem coupling assembly 78 normally interconnects the rotatable shafts of a pair of devices to be interconnected, such as the shafts of a turbine and a pump or a compressor or some other load. In this regard, the adapter 12 is connected to a shaft 80 which is shown to be coupled through a bearing assembly 82. The bearing assembly 82 represents one of the pair of devices, the shafts of which are interconnected by the tandem coupling assembly 78. Normally, these devices include at least a pair of bearings and are quite large in relation to the tandem coupling assembly. The device on the right side of the coupling is represented by the bearing assembly 82 for illustrative purposes only. Similarly the adapter 112 is connected to a shaft 180 which is supported by a bearing assembly 182. The shaft 180 and the bearing assembly 182 correspond to the shaft 80 and the bearing assembly 82, respectively, and represent the second device and shaft which is interconnected by the tandem coupling assembly 78.

During the operation of the tandem coupling assembly, the interconnected shafts 80 and 180 tend to become misaligned and/or moved axially with respect to their original positions. Should this occur, the discs 18, 20, and 22 of FIG. 1 can flex in the area of the convolutions shown as 36 and 38. This allows the coupling shaft 17 of FIGS. 1 and 6 to float to a new position between the pair of flexible couplings to accomodate the changed positions of the interconnected shafts 80 and 180. The 12 ½ inch coupling discs described above, were tested at 3200 RPM with 3/4 angular misalignment and 0.032 inches of axial misplacement and were operated successfully. Normally, it is expected that angular misalignment of about ¼° and ± 0.090 inches of axial misplacement can be expected. And these shaft displacements can be accomodated by the coupling of this invention.

Each of the individual coupling members 10 and 110 pivots about a point at the center of the coupling member itself, but is relatively stiff in a radial direction. This provides for increased stability of the coupling and necessitates the use of a pair of flexible coupling members 10 and 110 to provide for parallel offset between the two connected shafts 80 and 180. Thus the tandem coupling assembly 78 is required.

Some prior art couplings appear at first glance to be similar to the coupling of this invention. One such coupling is shown in French Pat. No. 446,977. However, based upon experience with the coupling shown in the preferred embodiment of this invention, it does not appear that this coupling can be successfully used in the tandem coupling assembly which is required to accomodate the three types of shaft misalignment and misplacement which can be expected from the devices represented by the bearing assemblies 82 and 182. It is not clear that this French patent appreciates the value of keeping the coupling discs separated in the flexing area. Furthermore, it appears that the coupling of this French patent is attempting to accomodate all of the types of shaft misalignment and misplacement by providing a large plurality of radially soft convolutions. Based upon the experience with the preferred embodiment of this inveniton, the large number of convolutions could provide an unstable coupling.

It is to be understood, of course, that the embodiment of this invention set forth herein is described in detail to present a full and clear description of the invention. This invention is not necessarily limited to the details of the particular embodiment presented. For example, FIG. 1 shows a flexible coupling using three discs. Couplings of the type described are often used with six discs and have been used with as many as 10 or 12 discs. The coupling itself is capable of operating at relatively high speeds of rotation. This includes speeds such that a point at the outside diameter of the coupling would rotate at about 600 feet per second surface speed as a normal maximum speed.

It is expected that those skilled in the art will make various changes, modifications, and substitutions in the illustrated embodiment without departing from the true scope and spirit of this invention which is defined in the appended claims.

What I claim as new and desire to obtain as Letters Patent of the United States is:

1. For use in a tandem coupling assembly for connecting a first rotatable shaft to a second rotatable shaft, with the tandem coupling assembly comprising a pair of flexible coupling members each of which is attached to one of the rotatable shafts and the coupling being interconnected by a coupling shaft; a flexible disc coupling member comprising in combination:

a. A plurality of thin, circular discs, each of said discs having at least one and no more than about four circumferentially extending convolutions, each of said convolutions being identical in shape and position on its respective disc with respect to corresponding convolutions on the other discs;

b. Each of said discs having a ring-shaped flexing area which includes said at least one and no more than about four convolutions with said flexing area and said convolutions being centered on the axis of the said disc;

c. Incompressible spacing means mounted between adjacent discs to prevent said adjacent discs from contacting one another during the operation of said flexible coupling member, with solids including said spacing means being absent from the space between the convolutions of adjacent discs;

d. First clamping means for holding said discs and said spacing means together without lateral movement therebetween and means for connecting the first rotatable shaft to said first clamping means;

e. Second clamping means for holding said discs and said spacing means together without lateral movement therebetween and means for connecting the second rotatable shaft to said second clamping means;

f. Means for mounting said first clamping means within the inside circumference of said ring-shaped flexing area and means for mounting said second clamping means around the outside circumference of said ring-shaped flexing area so that said flexing area extends between said first and second clamping means, wherein the ratio of the radius of the inside circumference of said flexing area to the radius of the outside circumference of the flexing area is less than approximately six-tenths.

2. A flexible coupling member according to claim 1 wherein said at least one convolution consists of at least two convolutions in an S-shaped configuration.

3. A flexible coupling member according to claim 1 wherein the ratio of the radius of the inside circumference of said flexing area to the radius of the outside circumference of said flexing area is less than approximately six-tenths; and said at least one convolution consists of at least two convolutions in an S-shaped configuration wherein the product of the thickness of one of said discs, expressed in inches, and the peak-to-peak height of the two convolutions, measured at the center lines of the disc material and also expressed in inches, is greater than about 0.0015 and less than about 0.0025.

4. A flexible coupling member according to claim 3 wherein said flexible coupling member is a relatively high speed coupling member such that said discs become hot during the operation of said coupling member, and at least some of said spacing means include vents leading from said flexing area to the atmosphere.

5. A flexible coupling member according to claim 1 wherein the ratio of the radius of the inside circumference of said ring-shaped flexing area to the radius of the outside circumference of the ring-shaped flexing area is between approximately four-tenths and six-tenths.

6. A flexible coupling member according to claim 5 wherein said at least one convolution consists of two convolutions in an S-shaped configuration.

7. A flexible coupling member according to claim 7 wherein the ratio of the radius of the inside circumference of said flexing area to the radius of the outside circumference of said flexing area is between approximately four-tenths and six-tenths; and said at least one convolution consists of two convolutions in an S-shaped configuration wherein the product of the thickness of one of said discs, expressed in inches. and the peak-to-peak height of the two convolutions, measured at the center line of the disc material and also expressed in inches, is greater than about 0.0015 and less than about 0.0025.

8. A flexible coupling member according to claim 7 wherein said flexible coupling member is a relatively high speed coupling member in which at least some of said spacing means include vents leading from said flexing area to the atmosphere.

9. For use in a tandem coupling assembly for connecting a first rotatable shaft to a second rotatable shaft, with the tandem coupling assembly comprising a pair of flexible coupling members each of which is attached to one of the rotatable shafts and the coupling being interconnected by a coupling shaft; a flexible disc coupling member comprising in combination:

a. A plurality of thin, circular discs, each of said discs having at least one and no more than about four circumferentially extending convolutions, each of said convolutions being identical in shape and position on its respective disc with respect to corresponding convolutions on the other discs;

b. Each of said discs having a ring-shaped flexing area which includes said at least one and no more than about four convolutions with said flexing area and said convolutions being centered on the axis of the said disc;

c. Incompressible spacing means mounted between adjacent discs to prevent said adjacent discs from contacting one another during the operation of said flexible coupling member, with solids including said spacing means being absent from the space between the convolutions of adjacent discs;

d. First clamping means for holding said discs and said spacing means together without lateral movement therebetween and means for connecting the first rotatable shaft to said first clamping means;

e. Second clamping means for holding said discs and said spacing means together without lateral movement therebetween and means for connecting the second rotatable shaft to said second clamping means;

f. Means for mounting said first clamping means within the inside circumference of said ring-shaped flexing area and means for mounting said second clamping means around the outside circumference of said ring-shaped flexing area so that said flexing area extends between said first and second clamping means, wherein said incompressible spacing means comprise a first plurality of metallic rings held by said clamping means within the inside circumference of said flexing area and a second plurality of metallic rings held by said second clamping means around the outside circumference of said flexing area; said second plurality of metallic rings comprising segmented rings which provide vents leading from said flexing area to the atmosphere.

10. For use in a tandem coupling assembly for connecting a first rotatable shaft to a second rotatable shaft, with the tandem coupling assembly comprising a pair of flexible coupling members each of which is attached to one of the rotatable shafts and the coupling being interconnected by a coupling shaft; a flexible disc coupling member comprising in combination:
   a. A plurality of thin, circular discs, each of said discs having at least one and no more than about four circumferentially extending convolutions, each of said convolutions being identical in shape and position on its respective disc with respect to corresponding convolutions on the other discs;
   b. Each of said discs having a ring-shaped flexing area which includes said at least one and no more than about four convolutions with said flexing area and said convolutions being centered on the axis of the said disc;
   c. Incompressible spacing means mounted between adjacent discs to prevent said adjacent discs from contacting one another during the operation of said flexible coupling member, with solids including said spacing means being absent from the space between the convolutions of adjacent discs;
   d. First clamping means for holding said discs and said spacing means together without lateral movement therebetween and means for connecting the first rotatable shaft to said first clamping means;
   e. Second clamping means for holding said discs and said spacing means together without lateral movement therebetween and means for connecting the second rotatable shaft to said second clamping means;
   f. Means for mounting said first clamping means within the inside circumference of said ring-shaped flexible area and means for mounting said second clamping means around the outside circumference of said ring-shaped flexing area so that said flexing area extends between said first and second clamping means;
   g. A flexible coupling member accoding to claim wherein said means for connecting the first rotatable shaft to said first clamping means comprises a second flexible coupling member substantially identical to said flexible coupling member and also comprising a coupling shaft interconnecting said first clamping means of each of said flexible coupling members;
   h. with respect to all of said discs, the ratio of the radius of the inside circumference of said flexing area to the radius of the outside circumference of said flexing area is between approximately four-tenths and six-tenths; and said at least one convolution consists of two convolutions in an S-shaped configuration wherein the product of the thickness of one of said discs, expressed in inches, and the peak-to-peak height of the two convolutions, measured at the center line of the disc material and also expressed in inches, is greater than about 0.0015 and less than about 0.0025.

11. A flexible coupling member according to claim 10 wherein said flexible coupling member is a relatively high speed coupling member in which at least some of said spacing means include vents leading from said flexing area to the atmosphere.

12. For use in a tandem coupling assembly for connecting a first rotatable shaft to a second rotatable shaft, with the tandem coupling assembly comprising a pair of flexible coupling members each of which is attached to one of the rotatable shafts and the coupling being interconnected by a coupling shaft; a flexible disc coupling member comprising in combination:
   a. A plurality of thin, circular discs, each of said discs having at least one and no more than about four circumferentially extending convolutions, each of said convolutions being identical in shape and position on its respective disc with respect to corresponding convolutions on the other disc;
   b. Each of said discs having a ring-shaped flexing area which includes said at least one and not more than about four convolutions with said flexing area and said convolutions being centered on the axis of the said disc;
   c. Incompressible spacing means mounted between adjacent discs to prevent said adjacent discs from contacting one another during the operation of said flexible coupling member, with solids including said spacing means being absent from the space between the convolutions of adjacent discs;
   d. First clamping means for holding said discs and said spacing means together without lateral movement therebetween said first clamping means including a circular adapter for connecting the first rotatable shaft to said flexible coupling;
   e. Second clamping means for holding said discs and said spacing means together without lateral movement therebetween said second clamping means including a second circular adapter for connecting the second rotatable shaft to said flexible coupling member;
   f. means for mounting said first circular adapter within the inside circumference of said ring-shaped flexing area and means for mounting said second circular adapter at the outside circumference of said ring-shaped flexing area, wherein the ratio of the radius of the inside circumference of the flexing area to the radius of the outside circumference of said flexing area is less than approximately four-tenths; said incompressible spacing means including vents from between the flexing area of adjacent discs to the atmosphere.

13. A flexible coupling member according to claim 12 wherein said at least one convolution consists of two convolutions in an S-shaped configuration wherein the product of the thickness of one of said discs, expressed in inches, and the peak-to-peak height of the two convolutions, measured at the center lines of the disc material and also expressed in inches, is greater than about 0.0015 and less than about 0.0025.

14. A flexible coupling member according to claim 13 wherein said means for connecting the first rotatable shaft to said first clamping means comprises a second flexible coupling member substantially identical to said flexible coupling member and also comprises a coupling shaft interconnecting said first clamping means of each of said flexible coupling members.

15. For use in a tandem coupling assembly for connecting a first rotatable shaft to a second rotatable shaft, with the tandem coupling assembly comprising a pair of flexible coupling members each of which is attached to one of the rotatable shafts and the coupling being interconnected by a coupling shaft; a flexible disc coupling member comprising in combination:
   a. A single thin, circular disc having at least one and no more than about four circumferentially extending convolutions;
   b. said disc having a ring-shaped flexing area which includes at least one and no more than about four convolutions with said flexing area and said convolutions being centered on the axis of said disc;
   c. first clamping means for holding said disc therebetween and means for connecting the first rotatable shaft to said first clamping means;
   d. second clamping means for holding said disc therebetween and means for connecting the second rotatable shaft to said second clamping means;
   e. means for mounting said first clamping means within the inside circumference of said ring-shaped flexing area and means for mounting said second clamping means around the outside circumference of said ring-shaped flexing area so that said flexing area extends between said first and second clamping means; and
   f. wherein the ratio of the radius of the inside circumference of said flexing area to the radius of the outside circumference of the flexing area is less than approximately six-tenths.

16. A flexible coupling member according to claim 15 wherein the ratio of the radius of the inside circumference of said flexing area to the radius of the outside circumference of said flexing area is between approximately four-tenths and six-tenths; and said at least one convolution consists of at least two convolutions in an S-shaped configuration wherein the product of the thickness of one of said discs, expressed in inches, and the peak-to-peak height of the two convolutions, measured at the center line of the disc material and also expressed in inches, is greater than about 0.0015 and less than about 0.0025.

* * * * *